Patented Oct. 24, 1950

2,527,323

UNITED STATES PATENT OFFICE 2,527,323

PRODUCTION OF SUBSTITUTED DERIVATIVES OF N,N'-METHYLENEBIS-(HEXAHYDROPYRIMIDINES)

Glen H. Morey, Terre Haute, Ind., assignor to Commercial Solvents Corporation, Terre Haute, Ind., a corporation of Maryland No Drawing. Application August 28, 1948, Serial No. 46,724

7 Claims. (Cl. 260—251)

My invention relates to the production of substituted derivatives of N,N'-methylenebis-(hexahydropyrimidines). More particularly, it relates to compounds of the following structural formula and to a method of preparing them:

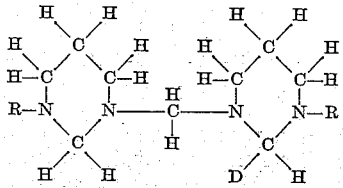

wherein R represents a substituent selected from the group consisting of alkyl, cycloalkyl, dialkylaminoalkyl, furfuryl, aryl, aralkyl, hydroxyalkyl and alkoxyalkyl.

As examples of the new compounds included in the above formula may be mentioned: N,N'-methylenebis-(-3 - isopropyl - hexahydropyrimidine), N,N' - methylenebis - [-3-(-3 - dibutylaminopropyl) -hexahydropyrimidine], N,N'-methylenebis-( - 3 - cyclohexylhexahydropyrimidine), N,N'-methylenebis - ( - 3 - furfurylhexahydropyrimidine), N,N'-methylenebis-(-3-phenylhexahydropyrimidine), N,N'-methylenebis-(-3-benzylhexahydropyrimidine), N,N'-methylenebis - [ - 3 - (-2 - hydroxyethyl) hexahydropyrimidine], N,N'-methylenebis-(-3-methoxyethylhexahydropyrimidine).

Compounds of the above character may be produced by reacting at least 1.5 moles, and preferably about two moles, of formaldehyde with a diamine of the following general structure until condensation is substantially complete:

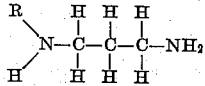

wherein R represents the substituents described above.

The reaction between formaldehyde and the amine is preferably carried out at a temperature below about 125° C. The reaction is exothermic in character and in general is initiated at a temperature within the range of 25–50° C. It is frequently desirable or even necessary to cool the reaction mixture in order to maintain it within the generally preferred range of 40–90° C.

A solvent which is inert under the conditions of the reaction may be used for maintaining the reactants in solution while the reaction is being carried out. Examples of suitable solvents include methanol and other monohydric alcohols. In general, solvents which do not enter into the reaction or react with any products thereof may be employed.

The diamines used in my process include N-isopropyl-1,3-propanediamine, N-(3 - dibutylaminopropyl) -1,3-propanediamine, N-(2 - ethylhexyl) -1,3-propanediamine, N-(beta-hydroxyethyl) -1,3-propanediamine, N - cyclohexyl-1,3 - propanediamine, N-furyl-1,3-propanediamine, N-phenyl-1,3-propanediamine, N-(-2 - phenylethyl) -1,3 - propanediamine, and the like.

In order to obtain the substituted derivatives of N,N'-methylenebis-(hexahydropyrimidines) of my invention it is necessary that one of the amino groups of the diamine employed in the reaction be primary and the other secondary. If both amino groups are primary, resinous, tarry materials are formed. Contrary to what one might expect, the primary amino groups of the diamines used in my invention do not form resinous or tarry products.

These new products produced by my novel reaction may be used variously. One use is in the production of wetting agents by converting them to the lauric or oleic salts, or to quaternary ammonium salt. The reaction products of formaldehyde may be used as a source of plastics, for example in condensation reaction with phenol.

The following examples illustrate the process by which my new compounds may be prepared.

Example I

A solution of 152 grams (1.31 moles) of N-isopropyl-1,3-propanediamine in 100 cc. of methanol was first prepared. To this was then added portionwise 84 grams (2.8 moles) of formaldehyde in 40% aqueous solution while stirring and cooling to maintain the temperature at 30–40° C. The solution was finally heated to 60° C. on the steam bath. The methanol and other volatile constituents were distilled off at 50 mm. mercury pressure, to a pot temperature of 110° C. The product was then distilled at 2 mm. pressure and yielded 91 grams of N,N'-methylenebis-(-3-isopropyl-1,3-diazacyclohexyl), boiling at 130–135° C.

Example II

One mole, 243 grams, of N-(-3-dibutylaminopropyl) -1,3-propanediamine was placed in a beaker with 200 cc. of methanol. Then two moles of formaldehyde in 40% aqueous solution were added portionwise while stirring and cooling to maintain the temperature at 40–50° C. After about three-fourths of the formaldehyde had been added, two layers formed. The mixture was finally heated and stirred for a few minutes on the steam bath. The methanol and other volatile constituents were then distilled off to a pot temperature of 130° C. A small amount of additional material was distilled off at 2 mm. pressure to a pot temperature of 150° C. The undistilled material left in the flask consisted of 230 grams of N,N'-methylenebis-[-3-(-3 - dibutylaminopropyl) -1,3-diazacyclohexyl].

I claim as my invention:

1. As a new composition of matter, a substituted derivative of N,N'-methylenebis-(hexahydropyrimidines).

2. As a new composition of matter, a substituted derivative of N,N'-methylenebis-(hexahydropyrimidines), having the structure:

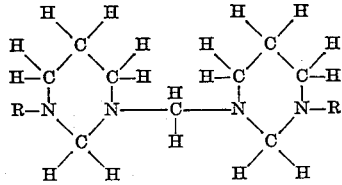

wherein R represents a substituent selected from the group consisting of alkyl, cycloalkyl, dialkylaminoalkyl, furfuryl, aryl, aralkyl, hydroxyalkyl and alkoxyalkyl.

3. As a new composition of matter, N,N'-methylenebis-(-3-isopropyl-1,3-diazacyclohexyl).

4. As a new composition of matter, N,N'-methylenebis - [ - 3 - (-3-dibutylaminopropyl) -1,3-diazacyclohexyl].

5. A process for preparing substituted derivatives of N,N'-methylenebis-(hexahydropyrimidines) having the formula:

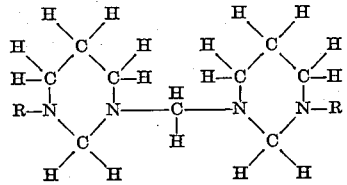

wherein R represents a substituent selected from the group consisting of alkyl, cycloalkyl, dialkylaminoalkyl, furfuryl, aryl, aralkyl, hydroxyalkyl and alkoxyalkyl, said process comprising reacting formaldehyde with a diamine wherein one amino group is primary and one amino group is secondary, in the proportion of at least 1.5 moles of aldehyde per mole of diamine.

6. A process for preparing substituted derivatives of N,N'-methylenebis-(hexahydropyrimidines) having the formula:

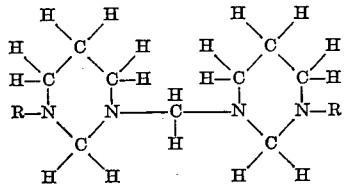

wherein R represents a substituent selected from the group consisting of alkyl, cycloalkyl, dialkylaminoalkyl, furfuryl, aryl, aralkyl, hydroxyalkyl and alkoxyalkyl, said process comprising mixing formaldehyde with a diamine having the formula:

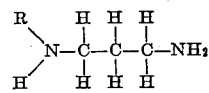

wherein R is a radical selected from the group consisting of alkyl, cycloalkyl, aryl, and aralkyl radicals, in the proportion of at least 1.5 moles of formaldehyde per mole of diamine.

7. The process of claim 6 wherein R is an isopropyl group.

GLEN H. MOREY.

No references cited.

Certificate of Correction

Patent No. 2,527,323                                                  October 24, 1950

GLEN H. MOREY

It is hereby certified that error appears in the printed specification of the above numbered patent requiring correction as follows:

Column 1, lines 12 to 14, inclusive, for that portion of the formula reading

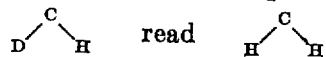

and that the said Letters Patent should be read as corrected above, so that the same may conform to the record of the case in the Patent Office.

Signed and sealed this 2nd day of January, A. D. 1951.

[SEAL]

THOMAS F. MURPHY,
*Assistant Commissioner of Patents.*